(12) United States Patent
Cheng et al.

(10) Patent No.: US 8,603,348 B2
(45) Date of Patent: Dec. 10, 2013

(54) METHOD OF REDUCING MAIN POLE CORROSION DURING ALUMINUM OXIDE ETCH

(75) Inventors: Chao-Peng Cheng, Fremont, CA (US); Chih-I Yang, San Jose, CA (US); Jas Chudasama, Milpitas, CA (US); William Stokes, Milpitas, CA (US); Chien-Li Lin, Fremont, CA (US); David Wagner, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 325 days.

(21) Appl. No.: 12/930,754

(22) Filed: Jan. 14, 2011

(65) Prior Publication Data

US 2012/0181181 A1    Jul. 19, 2012

(51) Int. Cl.
   *H01L 21/302*   (2006.01)
   *H01L 21/461*   (2006.01)
   *B44C 1/22*     (2006.01)
   *C23F 1/00*     (2006.01)
   *C03C 15/00*    (2006.01)
   *C03C 25/68*    (2006.01)

(52) U.S. Cl.
   USPC ............. 216/22; 438/689; 438/745; 438/753; 216/83

(58) Field of Classification Search
   None
   See application file for complete search history.

(56) References Cited

U.S. PATENT DOCUMENTS

| 5,883,762 | A  | * | 3/1999  | Calhoun et al. | 205/119 |
| 6,656,289 | B2 | * | 12/2003 | Yates          | 134/3   |
| 7,536,775 | B2 |   | 5/2009  | Peterson et al. | |
| 7,748,104 | B2 |   | 7/2010  | Bonhote et al. | |
| 2003/0136428 | A1 | * | 7/2003  | Krogh       | 134/28 |
| 2008/0253035 | A1 | * | 10/2008 | Han et al.  | 360/319 |
| 2010/0006860 | A1 |   | 1/2010  | Roedle et al. | |
| 2011/0011744 | A1 |   | 1/2011  | Chen et al. | |

FOREIGN PATENT DOCUMENTS

EP    0325097    *    7/1989

OTHER PUBLICATIONS

Atlas of Electrochemical Equilibria in Aqueous Solutions, by Marcel Pourbaix, Second English Edition, 1974, Houston, TX, National Association of Corrosion Engineers, p. 314.
"A Sodium Carbonate-bicarbonate Buffer for Alkaline Phosphatases," by G.E. Delory et al., vol. 39, p. 245, Received Mar. 27, 1945.

* cited by examiner

*Primary Examiner* — Nadine Norton
*Assistant Examiner* — Stephanie Duclair
(74) *Attorney, Agent, or Firm* — Saile Ackerman LLC; Stephen B. Ackerman

(57) ABSTRACT

A method of removing an alumina layer around a main pole layer during perpendicular magnetic recording head fabrication is disclosed. The alumina etch sequence includes immersing a substrate in a series of aqueous solutions purged with an inert gas to remove oxygen thereby avoiding corrosion of the main pole. Initially, the substrate is soaked and heated in deionized (DI) water. Once heated, the substrate is immersed in an etching bath at about 80° C. and pH 10.5. Bath chemistry is preferably based on $Na_2CO_3$ and $NaHCO_3$, and $N_2$ purging improves etch uniformity and reduces residue. Thereafter, the substrate is rinsed in a second DI water bath between room temperature and 80° C., and finally subjected to a quick dump rinse before drying. Inert gas, preferably $N_2$, may be introduced into the aqueous solutions through a purge board having a plurality of openings and positioned proximate to the bottom of a bath container.

20 Claims, 5 Drawing Sheets

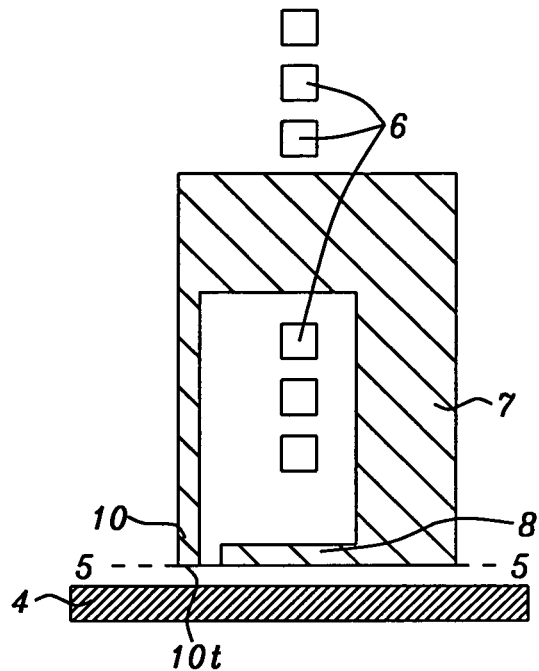
FIG. 1 - Prior Art
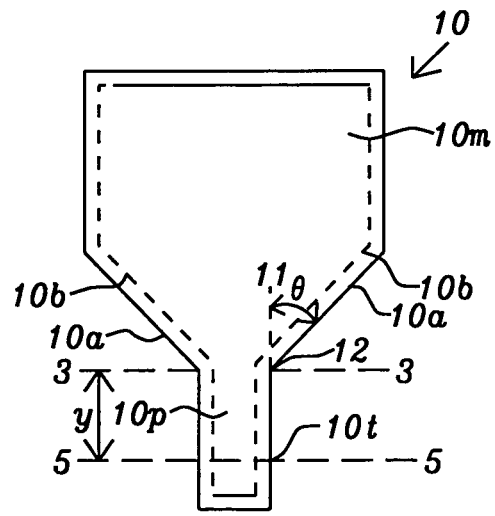
FIG. 2 - Prior Art

METHOD OF REDUCING MAIN POLE CORROSION DURING ALUMINUM OXIDE ETCH

RELATED PATENT APPLICATION

This application is related to Ser. No. 12/460,432, filing date Jul. 17, 2009; assigned to the same assignee as the current invention and which is herein incorporated by reference in its entirety.

FIELD OF THE INVENTION

The invention relates to a method of fabricating a perpendicular magnetic recording (PMR) head whereby the main pole layer is less susceptible to corrosion and residues as a result of exposure to aqueous solutions during an etch process that removes adjacent portions of an aluminum oxide layer.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. PMR uses a magnetic yoke surrounded by field coils that terminates in a write pole which serves as the write head. The write pole must be wide enough at one end to attach to the yoke and narrow enough at the other end to confine the write flux to a very small area typically about 0.1×0.1 microns at an air bearing surface (ABS). The write pole is adjoined on the sides by a dielectric layer (side gap) and has a top surface including a trailing edge that is covered with a write gap to separate the write pole from a trailing shield.

A conventional PMR write head as depicted in FIG. 1 typically has a main pole layer 10 or write pole with a pole tip 10$t$ at an ABS 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field in the write pole tip 10$t$ at the ABS is high enough to switch magnetizations in the recording media 4. A trailing shield is added to improve the field gradient in the down-track direction.

Referring to FIG. 2, a top view is shown of a typical main pole layer 10 that has a large, wide portion called a yoke 10$m$ and a narrow rectangular portion 10$p$ called a write pole that extends a neck height (NH) distance y from the ABS plane 5-5 to a plane 3-3 parallel to the ABS where the write pole intersects the yoke at the neck 12. The main pole layer 10 flares outward at an angle θ from a dashed line 11 that is an extension of one of the long rectangular sides of the write pole 10$p$. PMR technologies usually require the write pole 10$p$ at the ABS to have a beveled shape (as viewed from the ABS) so that the skew related writing errors can be suppressed. In other words, the top edge 10$a$ of the main pole layer 10 usually overhangs the lower edge 10$b$ by a certain amount.

Although a PMR head which combines the features of a single pole writer and a soft magnetic underlayer has a great advantage over LMR in providing higher write field, better read back signal, and potentially much higher areal density, PMR still faces some challenges. One issue is related to the manufacture of PMR heads wherein some designs require an alumina layer around the main pole to be removed in order to allow a conformal side gap to be formed along the sides of the trapezoidal shaped write pole prior to write gap deposition. One problem associated with the conventional alumina etching process is the potential for main pole corrosion during de-ionized water soaking steps as predicted thermodynamically in "Atlas of electrochemical equilibria in aqueous solutions" by M. Pourbaix, 2$^{nd}$ English Ed., 1974, Houston, Tex., National Association of Corrosion Engineers. Main pole corrosion lowers production yields and degrades product quality but the root cause of corrosion is not fully understood. A possible corrosion mechanism may be due to an oxidation-reduction reaction associated with the following two equations (1a) and (1b):

Reduction: $O_2 + 2H_2O + 4e^- => 4OH^-$      (1a)

Oxidation: $Fe => Fe^{2+} + 2e^-$      (1b)

Another problem with the typical alumina etching process is an unstable alumina etching rate which tends to drift lower because of the absorption of $CO_2$ from air in the alkaline EDTA etch solution and an insufficient buffer capacity in the EDTA solution. As a result, undesirable alumina residue builds up around the main pole thereby affecting product performance.

A routine search of the prior art revealed the following references. In U.S. Pat. No. 7,748,104, a method of preventing corrosion during formation of the write pole is disclosed and involves forming a gap layer comprised of a noble metal on the write pole. However, this method does not address the susceptibility of the write pole to corrosion prior to formation of the gap layer.

U.S. Pat. No. 7,536,775 discloses a method of selectively removing alumina around a main pole layer to avoid damaging the main pole. In particular, an aqueous solution of sodium carbonate or sodium borate is used at 50° C. and is then followed by a water rinse. The method does not teach how to improve etch uniformity or reduce residues.

In U.S. Patent Application Pub. No. 2010/0006860, $N_2$ is bubbled into a hot DI water solution to oxidize a top surface of a SiC substrate and thereby form a gate oxide.

U.S. Patent Application Pub. No. 2008/0253035 describes alumina etching with an alkaline solution comprising NaOH or KOH with EDTA at a pH greater than about 10.5 at 80° C. for about 15 seconds. However, none of the issues including corrosion, etch uniformity, or etch residues are addressed.

Thus, an improved alumina etching process is needed to overcome main pole corrosion and alumina residue issues regularly encountered in current fabrication techniques.

SUMMARY OF THE INVENTION

One objective of the present invention is to reduce main pole corrosion during alumina etching and thereby improve product yield during PMR head fabrication.

A second objective of the present invention is to minimize alumina residue around the main pole during alumina etching in order to improve product quality.

A third objective of the present invention is to improve alumina etch uniformity around the main pole.

A fourth objective of the present invention is to maintain a stable etch solution pH and hence provide a stable alumina etch rate while achieving the first three objectives.

According to one embodiment of the present invention, these objectives are realized by a process flow that involves purging with inert gas such as $N_2$ during each of the alumina etch steps. In one aspect, a purge board comprised of a plurality of circular holes that have sidewall openings or outlets connected to a $N_2$ gas line, for example, is positioned proximate to the bottom of a deionized (DI) water solution or alumina etch bath and may be held in place by supports that are attached to the bath container. Thus, when one or more wafers having a main pole layer formed within an alumina layer are placed within a boat and suspended in an aqueous solution above the $N_2$ purge board, the continuous $N_2$ flow essentially drives all $O_2$ from the solution. We have surprisingly found that corrosion is significantly reduced as a result of the inert gas purge which means the corrosion mechanism in the prior art may be due to an oxidation-reduction reaction requiring oxygen.

Prior to the alumina etch process steps of the present invention, a main pole layer is typically electrodeposited within an alumina layer on a substrate (wafer) and a top surface thereof is planarized. Then a photoresist layer is coated and patterned on the wafer surface to serve as an etch mask during an ion beam etch or reactive ion etch that removes portions of the alumina layer formed coplanar with the main pole layer. Portions of the alumina layer which adjoin the main pole layer are then removed by an inventive alumina etch sequence that involves wafer immersion in a series of aqueous solutions.

During a first process step in the alumina etch sequence of the present invention, an immersion Teflon heater that is $N_2$ purged, for example, through a sleeve of the heater is positioned at the base of a container of de-ionized (DI) water. In one embodiment, the heater has a lengthwise dimension along the bottom of the water container and there is a purge board above the Teflon heater having an orientation wherein the bottom surface of the purge board faces the heater and the base of the DI container. The aqueous solution is heated to a temperature in the range of 20° C. to 90° C. and is $N_2$ purged. Then the one or more wafers with a plurality of main pole structures formed in an alumina layer is suspended above the $N_2$ purge board and immersed in the heated and $N_2$ purged water solution for a certain period of time to allow the one or more wafers to reach the same temperature as the etching bath used in the following step.

Thereafter the one or more wafers are immersed in an alumina etch bath that is $N_2$ purged and heated to essentially the same temperature as in the DI water bath of the first step. In one embodiment, the alumina etch bath is comprised of an aqueous solution of $NaHCO_3$ and $Na_2CO_3$ with a pH between 9.5 and 11, and preferably 10.5 at a temperature of 80° C. Optionally, the alumina etch bath may be comprised of an aqueous solution of EDTA and NaOH with a pH from 9.5 to 11, or $KHCO_3$ and $K_2CO_3$ with a pH between 9.5 and 11. The injection of $N_2$ bubbles into the alumina etch bath reduces $CO_2$ absorption from the air and thus stabilizes the pH and improves buffering capability. Moreover, an added benefit of the $N_2$ purge during etching is the reduction of alumina residues adjacent to the main pole layer. The purge board may be positioned above a Teflon immersion heater proximate to the base of the alumina etch bath similar to the orientation in the first DI water immersion step.

At the end point of the alumina etch step, the one or more wafers are immersed in a second de-ionized water bath that is $N_2$ purged at a temperature intermediate between room temperature and the alumina etch bath temperature in order to provide a gradual cooling that prevents photoresist cracking due to shock from a sudden cooling step. Nitrogen purging is used in the cooling step and also in a final quick dump-rinse (QDR) step to reduce corrosion that is believed to result from exposure of metal to oxygen in an aqueous solution.

Following the QDR step, the one or more wafers may be dried by treatment with isopropanol vapor in a spin dryer, for example. A conventional series of process steps including deposition of a side gap and write gap on the main pole layer is then employed to complete the PMR head fabrication sequence.

BRIEF DESCRIPTION OF THE DRAWINGS

FIG. 1 is a cross-sectional view of a conventional PMR writer showing the main write pole, flux return pole, magnetic recording media, and coils that generate magnetic flux.

FIG. 2 is a top view showing a main write pole layer of a conventional PMR write head that has a narrow write pole section adjacent to the ABS and a larger yoke section with sides that flare outward at an angle θ from the sides of the narrow write pole.

DETAILED DESCRIPTION OF THE INVENTION

The present invention is a method of performing alumina etching during fabrication of a PMR write head that minimizes or eliminates metal corrosion of the main pole and etch residues. The terms substrate and wafer may be used interchangeably herein. The write head described in the exemplary embodiment may be part of a merged read-write head configuration and may have a shape other than the trapezoidal shape depicted in the exemplary embodiments.

In related patent application Ser. No. 12/460,432, we described a process for forming a main pole layer within an alumina layer on a substrate that involves deposition of a CoNiFe auxiliary layer on a Ru seed layer in an opening that will be subsequently filled with the main pole material made of $Co_xNi_yFe_z$ where each of x, y, and z is from 0 to 100 atomic % and x+y+z=100 atomic %. Thus, a main pole layer including a write pole portion adjoining an ABS is formed having a top surface that is coplanar with an adjacent dielectric layer such as alumina. Herein we disclose an alumina etching process that occurs following the formation of the write pole and before side gap and write gap layers are deposited on sidewalls and top surface, respectively, of the write pole portion.

Figure 3:
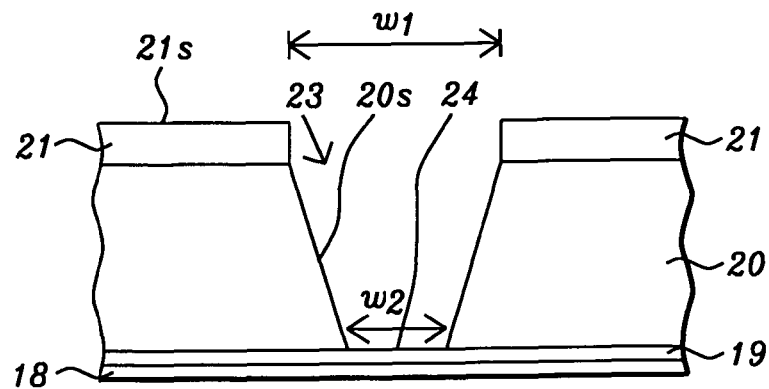
FIGS. 3-7 are cross-sectional views of a write pole and a surrounding alumina layer at the ABS showing a sequence whereby the write pole is formed within the alumina layer and subsequent dry etching and wet etching steps are used to remove the alumina and leave exposed write pole sidewalls.

Fabrication steps that are related to the present invention are depicted as FIGS. 3-7 and show cross-sectional views at the ABS of a substrate 18, write pole 30, and adjoining alumina layer 20 that is subsequently removed by an etching process as disclosed herein. Referring to FIG. 3, an opening 23 is formed within a dielectric layer 20 on a stack comprised of a substrate 18 and an etch stop layer 19 that contacts a top surface of the substrate. Substrate 18 may be made of AlTiC on which an etch stop layer 19 otherwise known as a RIE resistant layer is deposited. The RIE resistant layer 19 with a thickness of 200 to 1000 Angstroms may formed on the substrate 18 by a sputter deposition or physical vapor deposition (PVD) process, for example, and preferably includes a material such as Ru or NiCr that has a high etch selectivity relative to an insulating layer made of alumina or the like during a subsequent RIE etch that uses BCl$_3$, chlorine, and fluorocarbon gases. A dielectric layer 20 is formed on RIE resistant layer 19 and may be comprised of Al$_2$O$_3$ or silicon oxide deposited by a PVD process, a sputtering technique, or the like in the same deposition tool as the RIE resistant layer. In the preferred embodiments described herein, the dielectric layer will be referred to as alumina layer 20. In the exemplary embodiments, a hard mask 21 made of Ta or the like is formed on alumina layer 20 in order to facilitate an etch process that forms opening 23.

Opening 23 is formed by a conventional process including the formation of a photoresist masking layer (not shown) on top surface 21s, and then using a well known lithography patterning step to initially form an opening in the photoresist masking layer that is subsequently transferred through the hard mask 21 by a first reactive ion etch (RIE) step which stops on alumina layer 20. After the photoresist masking layer is removed, a second RIE step is employed to transfer the opening through alumina layer 20 and stop on the RIE resistant layer 19. Note the lower portion of opening 23 within alumina layer 20 has sloped sidewalls 20s that extend from a bottom surface of the hard mask 21 to the RIE resistant layer 19. The slope of the sidewalls may be adjusted by changing second RIE process conditions such as gas chemistry, pressure, and RF power. As a result, the width $w_1$ at the top of opening 23 is greater than the width $w_2$ along the bottom surface 24 of the opening, and the lower portion of the opening within alumina layer 20 has a trapezoidal shape. In one embodiment, opening 23 extends beyond a neck height distance from the ABS and also comprises a cavity (not shown) for the yoke portion of the main pole layer. Optionally, an opening for the yoke portion of the main pole layer may be formed in separate patterning and etching steps than employed for opening 23 where the narrow write pole portion of the main pole layer is deposited in a subsequent step.

Figure 4:
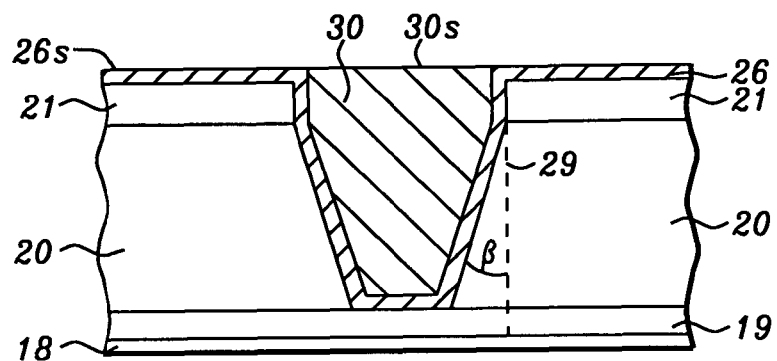

Referring to FIG. 4, a CMP stop layer that also serves as a seed layer 26 with top surface 26s is formed on hard mask 21 and along sidewalls 20s within opening 23. The widths w1, w2 may be further adjusted by depositing an additional alumina layer (not shown) described in related patent application Ser. No. 12/460,432. The seed layer 26 which is preferably Ru is deposited by an atomic layer deposition (ALD) method, sputter deposition process, or another technique. Preferably, a method is selected to deposit a conformal seed layer 26 along sidewalls 20s that forms an angle B of about 5 to 20 degrees with respect to a plane 29-29 which is perpendicular to the substrate 18 and ABS so that the skew related writing errors can be suppressed. Thereafter, the wafer comprising substrate 18 is immersed in a plating solution and an electroplating process is performed to deposit a magnetic layer 30 that fills opening 23 and also covers the top surface 26s of the seed layer 26. A chemical mechanical polish (CMP) process is then used to form a top surface 30s of write pole 30 that is coplanar with a top surface 26s of the seed layer.

Figure 5:
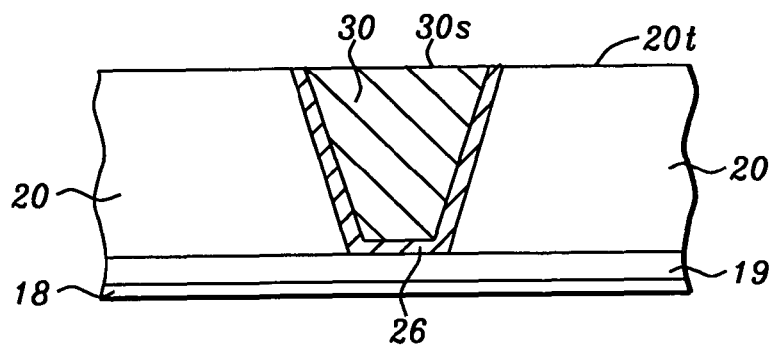

Referring to FIG. 5, an ion beam etch (IBE) may be employed to remove a top portion of the write pole 30, the seed layer 26 above the hard mask, and the hard mask 21 such that the top surface 30s is lowered to become coplanar with a top surface 20t of alumina layer 20.

Figure 6:
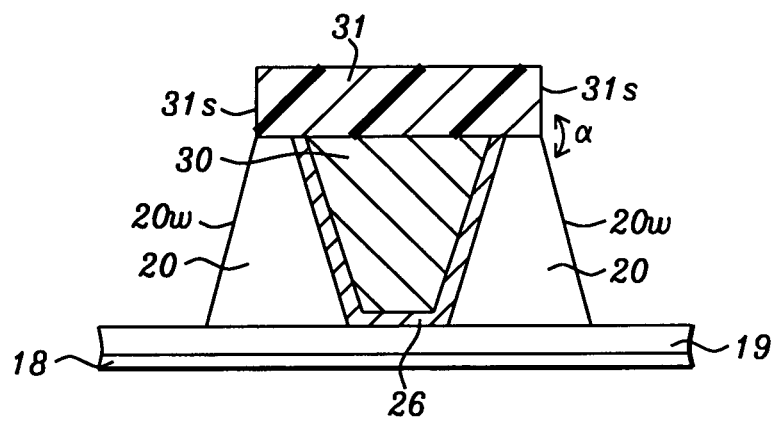

Referring to FIG. 6, a photoresist layer is formed on top surface 30s and top surface 20t and then patterned by a conventional method to form a photoresist mask 31 having sidewalls 31s that are substantially perpendicular with respect to top surface 30s. In a subsequent step, an IBE or reactive ion etch (RIE) process is performed to remove portions of alumina layer 20 not protected by photoresist mask 31. Note that the angle α formed by the intersection of sidewall 31s and alumina sidewall 20w may be 180 degrees or less than 180 degrees due to the nature of the etching process. The IBE or RIE process stops on RIE resistant layer 19. At this point, the alumina etch process flow of the present invention begins.

Figure 7:
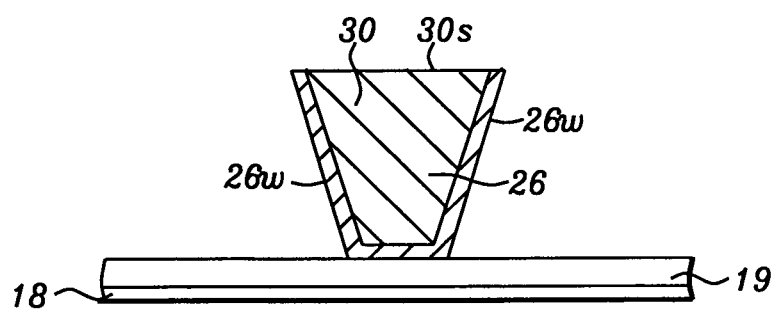
Figure 8:
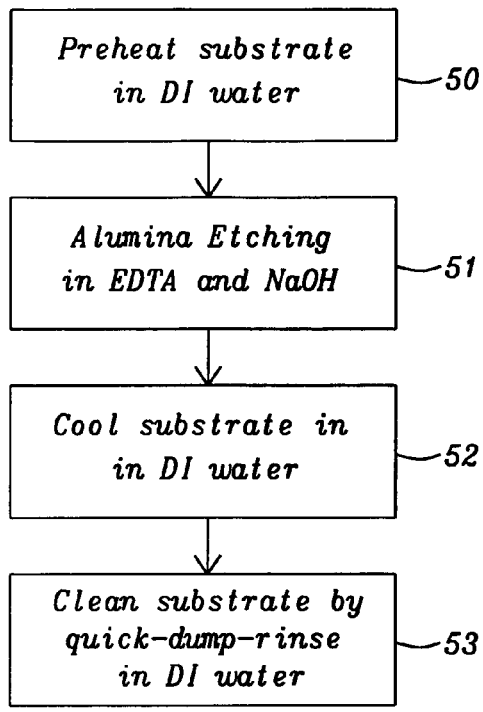
FIG. 8 is a process flow diagram that illustrates conventional alumina etch steps previously practiced by the inventors during the fabrication of a PMR head.

Referring to FIG. 8, a prior art alumina etch sequence practiced by the inventors is illustrated. Step 50 in the flow chart represents a first step whereby the substrate is soaked in a DI water bath that has been heated with an immersion heater to a temperature that is essentially the same as the alumina etch solution to be employed in the following step 51. Typically, the substrate 18 is immersed for about 3 minutes. In step 52, the substrate 18 is immersed in an alumina etch bath heated between 20° C. to 90° C. and comprised of ethylenediaminetetraacetic acid (EDTA) and NaOH in water. During reaction with the hydroxyl ions in solution, alumina is removed at the rate of about 1500 Angstroms per minute when pH of the EDTA/NaOH solution is approximately 10.5. At the completion of the etch step, the substrate 18 is removed from the alumina etch bath and soaked in a second DI water bath at a temperature between room temperature and the alumina etch bath temperature. The substrate is not cooled immediately to room temperature in order to prevent thermal shock that could cause the protective photoresist mask 31 (FIG. 7) to crack and undesirably expose a top surface of write pole 30 to the water. Finally, in step 53, wafer cleaning is accomplished by a quick dump rinse (QDR) method to remove any chemical residues on the wafer surface.

Referring to FIG. 7, once the alumina etch sequence is completed, photoresist mask 31 may be stripped by a conventional method to leave an exposed top surface 31s of write pole 30, and exposed sidewalls 26w. Ideally, all of alumina layer 20 is removed to afford a RIE resistant layer 19 having a top surface that is free of residue. However, we have found alumina residues (not shown) adjacent to sidewalls 26w that are detrimental to product performance. Moreover, exposure to water during steps 50-53 often leads to main pole corrosion as predicted in the Pourbaix reference. Therefore, we were motivated to improve the alumina etch sequence to mitigate the aforementioned problems that degrade write pole performance and cause lower product yields.

Figure 9:
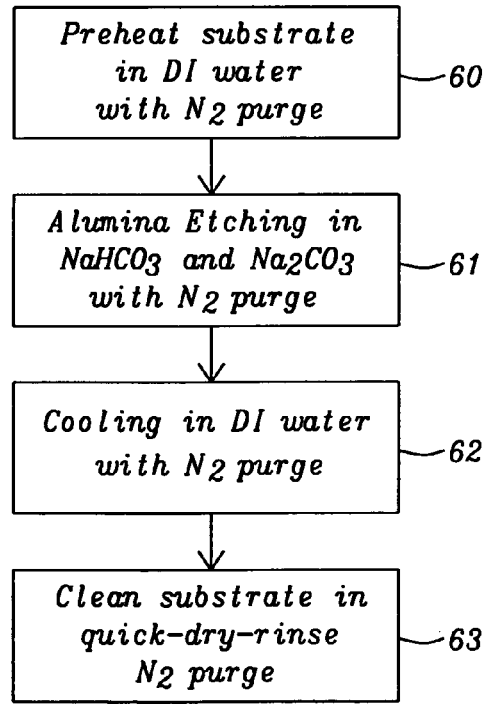
FIG. 9 is a process flow diagram which depicts an alumina etch sequence during PMR head fabrication according to one embodiment of the present invention.
Figure 10:
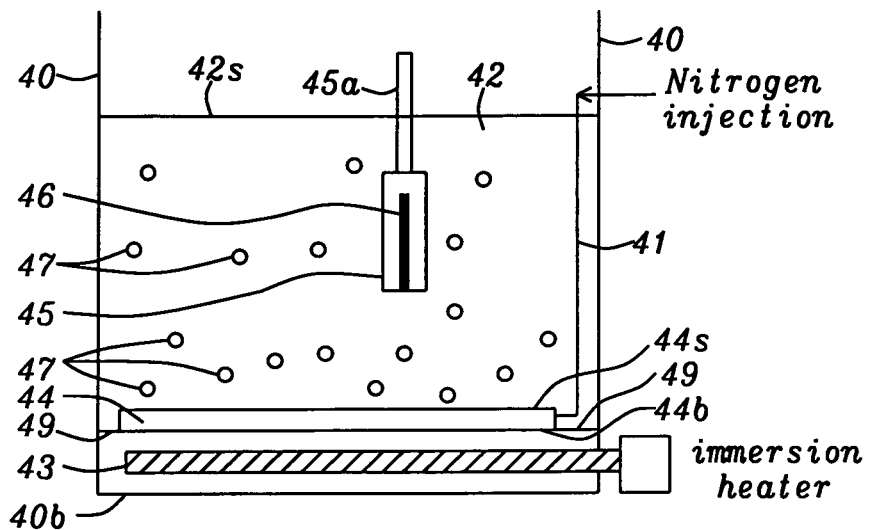
FIG. 10 is a side view of an alumina etch bath containing a $N_2$ purge board and immersion heater according to one embodiment of the present invention.

Referring to FIG. 9, one embodiment of the present invention is depicted in a flow chart that comprises an alumina etch sequence including process steps 60-63. A key feature is that the process flow involves a purge with an inert gas during each of the process steps. Preferably, N$_2$ is selected as the inert gas, but one or more gases including He, Ne, Ar, Kr, or Xe may be used in combination with N$_2$, or selected to replace N$_2$ as the purge gas. In one aspect as depicted in FIG. 10, a purge board 44 having a top surface 44s, bottom surface 44b, and comprised of a plurality of openings (FIG. 11) is employed to introduce the inert gas into an aqueous solution and is connected to a gas line 41. The purge board may be constructed from Teflon or other materials that are resistant to aqueous base solutions. According to one embodiment, the purge board 44 is placed proximate to the bottom of the bath solution 42 such that the bottom surface 44b is substantially parallel to the bottom 40b of the bath container 40. In one aspect, the purge board 44 may be held in place by a plurality of supports 49 that are fastened to the side of the bath container 40. The bath solution 42 may comprise DI water or alumina etch solution, and an immersion heater 43 may be used to heat the bath. Note that the purge board 44 does not necessarily rest on the bottom 40b of the bath container 40 but may be positioned above an immersion heater 43. Thus, when one or more wafers 46 having a main pole layer formed within an alumina layer are placed within a boat 45 and suspended by a handle 45a in bath solution 42 above the purge board, the continuous inert gas flow represented by bubbles 47 essentially removes all $O_2$ from the solution. It should be understood that oxygen is preferably purged from the bath solution prior to immersion of wafers, and the inert gas flow during wafer immersion is to maintain an oxygen free environment within the bath solution 42. The present invention anticipates that the inert gas flow rate from gas line 41 is sufficiently large enough to provide adequate temperature uniformity and distribution of chemical components within the bath solution such that a stirrer is not necessary.

Figure 11:
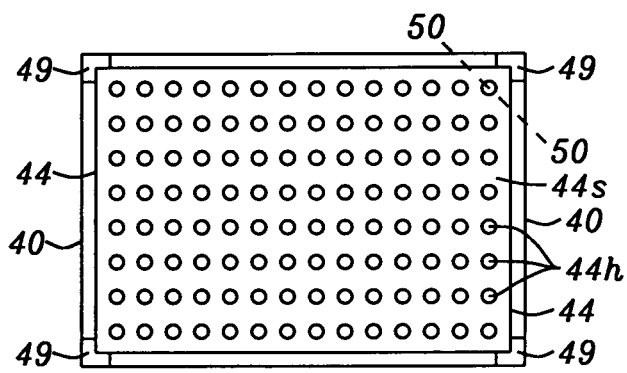
FIG. 11 is a top view showing a plurality of openings in a top surface of the $N_2$ purge board depicted in FIG. 10.

From a top-down view in FIG. 11, the purge board preferably has a top surface 44s that is sufficiently large to cover a substantial portion of the bottom of the bath container 40. Preferably, the purge board has a shape that matches the shape of the bath container. In one embodiment, both of the bath container and purge board have a substantially square shape and the purge board 44 rests on supports 49 located in each corner of the bath container 40. We have surprisingly found that write pole corrosion is significantly reduced as a result of the $N_2$ purging during wafer immersion which means the corrosion mechanism associated with prior art methods may be due to an oxidation-reduction reaction requiring oxygen. Each of the plurality of openings 44h may have a circular shape, for example, and comprise a sidewall (not shown) that extends from top surface 44s to a bottom surface of the purge board. The openings 44h may be formed in a pattern that comprises rows and columns as in the exemplary embodiment. Optionally, other shapes and/or patterns may be used for openings 44h and the openings may not have a uniform shape or size. In an alternative embodiment, the purge board 44 may be replaced by a plurality of Teflon tubes (not shown) that have multiple holes therein and each tube is connected to the inert gas line 41.

Figure 12:
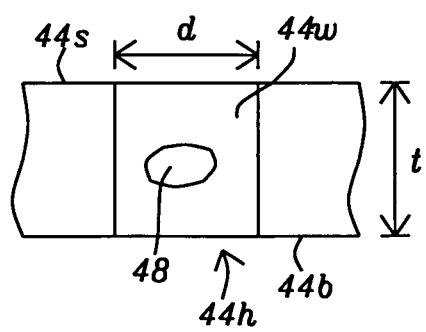
FIG. 12 is a cross-sectional view of a sidewall opening in the $N_2$ purge board pictured in FIGS. 10-11.

In FIG. 12, a cross-sectional view is shown of purge board 44 from along a plane 50-50 in FIG. 11. Each sidewall 44w within an opening 44h has at least one hole 48 which is an outlet connected to the inert gas line 41 (FIG. 10) to permit inert gas to flow into the bath solution 42. The diameter d of the opening 44h is generally at least one or two mm. Thickness t is represented by the distance between top surface 44s and bottom surface 44b. The inert gas flow through gas line 41 is preferably between 1 to 20 liters per minute for each 10 liters of liquid in bath solution 42.

Referring again to FIG. 9, step 60 comprises soaking one or more substrates in a DI water bath that is maintained at a temperature in the range of 20° C. to 90° C., and preferably between 75° C. and 85° C., and purged with inert gas from a purge board as described previously. Prior to immersing the one or more substrates, the DI water bath is brought to the desired temperature by heating with an immersion heater. During the time required to heat the DI water bath, the bath is also purged with inert gas, preferably $N_2$, to essentially remove all oxygen from the bath solution. Up to about 20 wafers may be placed in a boat and soaked in step 60 to improve process throughput.

In step 61, the substrates from step 60 are immediately immersed without drying in a heated and inert gas purged aqueous etch solution that is preferably comprised of $NaHCO_3$ and $Na_2CO_3$ and having a pH between 9.5 and 11, and more preferably 10.5. The alumina etch bath temperature in step 61 is preferably held within the same temperature range as the DI water bath used in step 60. More preferably, the alumina etch bath solution is maintained at approximately 80° C. Optionally, the alumina etch bath may be comprised of an aqueous solution of EDTA and NaOH with a pH from 9.5 toll, or $KHCO_3$ and $K_2CO_3$ with a pH between 9.5 and 11. With regard to an embodiment wherein the alumina etch bath is comprised of EDTA and NaOH, the injection of inert gas bubbles reduces $CO_2$ and oxygen absorption from the air and thus stabilizes the pH of the etch bath and improves buffering capability since the conversion of NaOH to $NaHCO_3$ ($NaOH+CO_2 \Rightarrow NaHCO_3$) can no longer occur without $CO_2$. To further reduce the impact of $CO_2$ absorption from the air and hence prevent solution pH drifting, alumina etch chemistry in the preferred embodiment is based on carbonate and bicarbonate salts. One advantage of using carbonate or bicarbonate ions is that excellent pH buffering is realized via the following chemical equation (2):

$$Na_2CO_3 + H_2O \Longleftrightarrow NaHCO_3 + NaOH \qquad (2)$$

Furthermore, $Na_2CO_3$ and $NaHCO_3$ (or $K_2CO_3$ and $KHCO_3$) do not form complex ions with transition metals. As a result, no undesirable metal etching occurs in an alumina etch bath comprising these salts.

End point for step 61 is preferably determined by the following process. Each batch of up to 20 wafers processed in step 60 includes a so-called model wafer that was prepared by depositing an alumina film on a bare wafer using the same process conditions as employed for forming an alumina layer on the product wafers in said batch. As a result, the model wafer has essentially the same alumina film thickness (initial alumina thickness) as the alumina layer formed adjacent to write pole structures on product wafers. Initial thickness on the model wafer can be measured by a standard method before steps 60-63 are performed. The model wafer is processed through steps 60-63 before sending the product wafers through the same sequence. In particular, the model wafer is pre-soaked (step 60) and then immersed by itself for a certain amount of time (i.e. 20 seconds) in the alumina etch bath (step 61), and finally processed through subsequent steps 62, 63 so that the remaining (final) alumina film thickness can be measured by a conventional technique. Using the known values of initial alumina film thickness, final alumina film thickness after a timed alumina etch, and the etch time in the alumina etch bath, an etch rate is calculated from the following equation (3): [Initial thickness-final thickness]/etch time=alumina etch rate. The etch rate and thickness for the product wafers are assumed to be equal to that of the model wafer. Therefore, the end point for step 61 which is the etch time allowed for the product wafers to be immersed in the alumina etch bath is simply calculated by dividing the alumina film thickness (model wafer initial thickness) by the etch rate calculated using equation (3) from the model wafer etch process. Preferably, there is no additional etch time allowed beyond the calculated end point, especially for NaOH/EDTA solutions since over etching may lead to undesirable etching of the write pole.

After the one or more product wafers have reached the end point in step 61, they are immediately immersed in a second DI water bath (step 62) that is inert gas purged and maintained at a temperature intermediate between room temperature and the temperature of the alumina etch bath. The time required for this step is 30 to 300 seconds. Step 62 serves two purposes which include (1) gradual cooling of the substrates to prevent thermal shock and cracking in the photoresist mask that protects the main pole layer as described previously, and (2) rinsing the substrates to remove etch solution therefrom and stop the etch process. We have found that purging with nitrogen or other inert gases prevents corrosion of the exposed main pole layer. Generally, the second DI water bath is replaced with a fresh DI water solution after each 12 hour shift to prevent a build up of etch bath components that could raise the pH of the second DI water bath and possibly lead to etching of write pole metal.

Finally, in step 63, the substrates are subjected to a quick dump-rinse process wherein the substrates are rinsed a second time in a DI water solution that is purged with inert gas to completely remove any residues remaining after step 62. The second DI water solution is maintained at ambient temperature. Quick dump-rinse refers to a process that involves immersing the substrates for 1 to 300 seconds in the second DI water solution.

Although not included in the process sequence depicted in FIG. 9, the substrates are usually dried following step 63 by placing the boat in which they are held in an isopropanol (IPA) dryer wherein the substrates are exposed to IPA vapor at about 80° C. and spun dry to completely remove water from surfaces thereof.

A series of experiments was performed to demonstrate the effectiveness of the method of the present invention in reducing main pole corrosion and improving etch uniformity during alumina etch processes.

Example 1

A first set of wafers on which 2.4 tesla CoNiFe films had been deposited were soaked in de-ionized water at 80° C. for ten minutes. The wafers were then sent through a spin-rinse-dry (SRD) cycle. A visual inspection through a microscope revealed corrosion in the form of rusty brown appearance for all CoNiFe films. A second set of wafers coated with 2.4 tesla CoNiFe films were processed with the same conditions as the first set except the DI water bath was purged with $N_2$ for at least 30 minutes prior to soaking the wafers and during the entire time the wafers were immersed in the 80° C. water bath according to an embodiment of the present invention. As a result of the $N_2$ purge, no corrosion was observed on any of the second set of wafers.

Example 2

A plurality of product wafers was processed to a point in the main pole fabrication process represented by FIG. 6 where a photoresist mask is formed over the write pole and the alumina layer has been partially etched away with an IBE method. A first set of wafers was immersed in a 30 liter alumina etch bath comprised of EDTA/NaOH with pH 10.5 at 80° C. to an end point as described previously. A second set of product wafers was immersed in an alumina etch bath with the same EDTA/NaOH composition with pH 10.5 at 80° C. as above except the etch solution was $N_2$ purged with a $N_2$ flow rate of about 5 liters/minute during the etch process according to an embodiment of the present invention. As a result, the average alumina thickness (residue) remaining after the standard etch process was 32.3 nm with a standard deviation of 4.2 nm, and the average alumina thickness remaining after the $N_2$ purge etch was 29.3 nm with standard deviation=2.1 nm. Therefore, the alumina residue around the write pole as measured by a focus ion beam (FIB) technique is significantly reduced by employing the $N_2$ purge process as defined herein. Note that a lower standard deviation with the $N_2$ purge method means improved within wafer etch uniformity.

Example 3

An alumina etch solution with a volume of about 30 liters was prepared by dissolving 286 gm $Na_2CO_3$ and 25 gm $NaHCO_3$ in a water bath at room temperature to give a solution with pH=10.5. A purge board was positioned above an immersion heater proximate to the bottom of the bath container as depicted in FIG. 10. The alumina etch solution was then heated to 80° C. during a period of about 30 minutes while being $N_2$ purged at a flow rate of 5 liters/minute. A model wafer with an alumina film was immersed in the alumina etch bath for about 20 seconds and then rinsed and dried according to an embodiment of the present invention represented in FIG. 9. The etch rate was calculated to be 1350 Angstroms per minute. After another 12 hours at 80° C. during which no additional wafers were processed, the pH of the alumina etch bath that was maintained under $N_2$ purge conditions was stable at pH=10.5. A second alumina etch bath was prepared by dissolving 72.5 gm NaOH and 540 gm EDTA in a 30 liter water bath and then heating to 80° C. with $N_2$ purging of the aqueous base solution. A model wafer with an alumina film was tested to determine an etch rate of 1500 Angstroms per minute. After 12 hours at 80° C., the pH of the alumina etch bath containing NaOH/EDTA had drifted to 10.3. Thus, an alumina etch bath based on $Na_2CO_3$/$NaHCO_3$ provides an etch rate comparable to one made of NaOH/EDTA but with the advantage of a more stable pH which translates into a more stable etch rate.

The alumina etch sequence of the present invention is readily incorporated into current manufacturing schemes by modification of existing bath containers with supports for a purge board. Moreover, the purge board can be inexpensively constructed from Teflon or other common materials. Improved etch uniformity, minimized main pole corrosion, and reduced residues are realized by implementing the alumina etch sequence of the present invention and lead to improved product performance and higher yields compared with results obtained by prior art methods.

While this invention has been particularly shown and described with reference to, the preferred embodiment thereof, it will be understood by those skilled in the art that various changes in form and details may be made without departing from the spirit and scope of this invention.

We claim:

1. A method of forming a write pole in a perpendicular magnetic recording head, comprising:
    (a) forming an opening in an alumina layer having a top surface, said opening has a bottom that exposes a portion of a substrate and has sidewalls that extend from the top surface to said substrate;
    (b) performing an electroplating process to deposit a main pole layer including a write pole portion that fills said opening;
    (c) planarizing said main pole layer to form a top surface thereof that is coplanar with said top surface of the alumina layer;
    (d) forming a photoresist mask on the write pole portion and on adjacent portions of the alumina layer;
    (e) ion beam etching or reactive ion etching the alumina layer except for adjacent portions around the write pole that are protected by the photoresist mask, said etching exposes certain regions of the substrate; and
    (f) removing the adjacent portions of the alumina layer by a sequence comprising:
        (1) soaking the substrate in a deionized (DI) water bath that is inert gas purged prior to soaking the substrate and during the soaking process;
        (2) immersing the substrate in an alumina etch bath that is inert gas purged prior to immersing the substrate and during an alumina etch process;

(3) rinsing the substrate in a second DI water bath that is inert gas purged prior to rinsing the substrate and during the rinsing process; and (4) performing a second rinse step that comprises a water solution purged with inert gas wherein inert gas purging is accomplished by introducing the inert gas through a plurality of holes in a purge board or through multiple holes in a plurality of Teflon tubes located proximate to a bottom of the DI water baths and proximate to a bottom of the alumina etch bath thereby allowing essentially complete removal of oxygen from the DI water baths and the alumina etch bath.

2. The method of claim 1 wherein soaking the substrate in a DI water bath is performed at a temperature between about 20° C. and 90° C., and purging with inert gas comprises a $N_2$ flow rate of about 1 to 20 liters per minute for every 10 liters of water in said DI water bath.

3. The method of claim 1 wherein immersing the substrate in an alumina etch bath is performed at a temperature between about 20° C. and 90° C., and purging with inert gas comprises a $N_2$ flow rate of about 1 to 20 liters per minute for every 10 liters of solution in said alumina etch bath.

4. The method of claim 3 wherein the alumina etch bath, and the DI water bath in step (1) are maintained at essentially equal temperatures.

5. The method of claim 3 wherein the alumina etch bath comprises an aqueous solution of $Na_2CO_3$ and $NaHCO_3$, or $K_2CO_3$ and $KHCO_3$, or NaOH and ethylenediaminetetra-acetic acid (EDTA).

6. The method of claim 5 wherein the alumina etch bath has a pH between about 9.5 and 11.

7. The method of claim 6 wherein the pH is about 10.5 and the temperature of the alumina etch bath is about 80° C.

8. The method of claim 1 wherein the inert gas is one or more of $N_2$, He, Ne, Ar, Kr, and Xe.

9. The method of claim 3 wherein the second rinse is performed at ambient temperature and the first rinse is performed at a temperature intermediate between that of the alumina etch bath temperature and the second rinse temperature.

10. The method of claim 1 wherein the inert gas purging is accomplished with a purge board comprised of a plurality of openings with outlets therein that are connected to an inert gas line, said purge board has top and bottom surfaces that are substantially parallel to a bottom of a container that holds the water bath or alumina etch bath.

11. A method of removing an alumina layer formed adjacent to a main pole layer on a substrate in a perpendicular magnetic recording head, comprising:

(a) soaking the substrate in a deionized (DI) water bath that is purged with inert gas and heated to a first temperature, the inert gas purge occurs before soaking the substrate and during the soaking process;

(2) immersing the substrate in an alumina etch bath that is purged with inert gas and heated to a first temperature, the inert gas purge occurs before immersing the substrate and during the immersion process;

(3) rinsing the substrate in a second DI water bath that is purged with inert gas and maintained at a second temperature, the inert gas purge occurs before rinsing the substrate and during the rinsing process; and (4) performing a second rinse step that comprises a water solution purged with inert gas wherein inert gas purging is accomplished by introducing the inert as through a plurality of holes in a purge board or through multiple holes in a plurality of Teflon tubes located proximate to a bottom of the DI water baths and proximate to a bottom of the alumina etch bath thereby allowing essentially complete removal of oxygen from the DI water baths and the alumina etch bath.

12. The method of claim 11 wherein the first temperature is between about 20° C. and 90° C.

13. The method of claim 11 wherein purging with inert gas comprises a nitrogen flow rate of about 1 to 20 liters per minute for every 10 liters of water in said alumina etch bath or water bath.

14. The method of claim 12 wherein the alumina etch bath comprises an aqueous solution of $Na_2CO_3$ and $NaHCO_3$, or $K_2CO_3$ and $KHCO_3$, or NaOH and ethylenediaminetetra-acetic acid (EDTA).

15. The method of claim 14 wherein the alumina etch bath has a pH between about 9.5 and 11.

16. The method of claim 15 wherein the pH is about 10.5 and the temperature of the alumina etch bath is about 80° C.

17. The method of claim 12 wherein the second rinse step is performed at ambient temperature, and the second temperature is intermediate between the first temperature and the ambient temperature of the second rinse.

18. The method of claim 11 wherein the inert gas is one or more of $N_2$, He, Ne, Ar, Kr, and Xe.

19. The method of claim 11 wherein purging with inert gas is accomplished with a purge board comprised of a plurality of openings with outlets therein that are connected to an inert gas line, said purge board has top and bottom surfaces that are substantially parallel to a bottom of a container that holds the water bath or alumina etch bath.

20. The method of claim 19 wherein the purge board is positioned proximate to the bottom of the water bath or alumina etch bath, and one or more substrates are held in a boat above a top surface of the purge board during a soaking, immersing, or rinsing step.

* * * * *

UNITED STATES PATENT AND TRADEMARK OFFICE
CERTIFICATE OF CORRECTION

| | | |
|---|---|---|
| PATENT NO. | : 8,603,348 B2 | Page 1 of 1 |
| APPLICATION NO. | : 12/930754 | |
| DATED | : December 10, 2013 | |
| INVENTOR(S) | : Chen et al. | |

It is certified that error appears in the above-identified patent and that said Letters Patent is hereby corrected as shown below:

On the title page, item [12], should read Chen et al.

On the title page, item [75], delete first Inventor "Chao-Peng Cheng, Fremont, CA (US)" and insert -- Chao-Peng Chen, Fremont, CA (US) --.

Signed and Sealed this
Sixteenth Day of December, 2014

Michelle K. Lee
*Deputy Director of the United States Patent and Trademark Office*